(12) United States Patent
Vintzel et al.

(10) Patent No.: US 11,055,110 B2
(45) Date of Patent: Jul. 6, 2021

(54) OPERATING SYSTEM SERVICE FOR PERSISTENTLY EXECUTING PROGRAMS

(71) Applicant: Microsoft Technology Licensing, LLC, Redmond, WA (US)

(72) Inventors: John James Vintzel, Redmond, WA (US); Sarjana Sheth Mitra, Yarrow Point, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 234 days.

(21) Appl. No.: 16/000,778

(22) Filed: Jun. 5, 2018

(65) Prior Publication Data

US 2019/0370015 A1 Dec. 5, 2019

(51) Int. Cl.
| | | |
|---|---|---|
| *G06F 9/445* | (2018.01) | |
| *G06F 9/4401* | (2018.01) | |
| *G06F 9/46* | (2006.01) | |
| *G06F 9/48* | (2006.01) | |

(52) U.S. Cl.
CPC ........ *G06F 9/44505* (2013.01); *G06F 9/4401* (2013.01); *G06F 9/44568* (2013.01); *G06F 9/461* (2013.01); *G06F 9/485* (2013.01)

(58) Field of Classification Search
CPC ............... G06F 9/44505; G06F 9/4401; G06F 9/44568; G06F 9/461; G06F 9/485
See application file for complete search history.

(56) References Cited

U.S. PATENT DOCUMENTS

| | | | | |
|---|---|---|---|---|
| 5,388,198 | A * | 2/1995 | Layman | G06F 9/453 715/812 |
| 6,453,430 | B1 * | 9/2002 | Singh | G06F 11/0715 712/227 |
| 6,731,536 | B1 * | 5/2004 | McClain | G11C 7/24 365/185.04 |
| 7,975,176 | B2 * | 7/2011 | Bak | G06F 11/1438 714/15 |
| 7,979,555 | B2 * | 7/2011 | Rothstein | H04L 67/14 709/227 |
| 8,510,755 | B2 * | 8/2013 | Paramasivam | G06F 11/0757 714/13 |
| 9,554,366 | B2 | 1/2017 | Anchan et al. | |
| 9,588,897 | B2 | 3/2017 | Clausen et al. | |
| 9,678,683 | B1 * | 6/2017 | Chen | G06F 3/0683 |
| 9,760,399 | B1 * | 9/2017 | Fraser | G06F 9/485 |
| 10,031,772 | B2 * | 7/2018 | Chu | G06F 9/485 |

(Continued)

OTHER PUBLICATIONS

<icrosoft Press Ebook Windows 10, 2016, 64-70 (Year: 2016).*

(Continued)

*Primary Examiner* — Aurel Prifti
(74) *Attorney, Agent, or Firm* — Alleman Hall Creasman & Tuttle LLP

(57) ABSTRACT

An operating system service for persistently executing programs comprises a registration service configured to register a manifest defining a persistence mode of a user-controllable program. The operating system service further comprises a runtime service configured, based on the persistence mode defined via the manifest, to detect and reject termination requests for the program, and to detect that the program has terminated and restart execution of the program.

17 Claims, 4 Drawing Sheets

(56) References Cited

U.S. PATENT DOCUMENTS

| | | | | |
|---|---|---|---|---|
| 2003/0004882 | A1* | 1/2003 | Holler | G06F 8/65 |
| | | | | 705/51 |
| 2004/0193699 | A1* | 9/2004 | Heymann | H04L 29/06 |
| | | | | 709/218 |
| 2005/0021917 | A1* | 1/2005 | Mathur | G06F 9/44594 |
| | | | | 711/159 |
| 2005/0034129 | A1* | 2/2005 | Chew | G06F 9/44594 |
| | | | | 718/100 |
| 2005/0204198 | A1* | 9/2005 | Pagan | G06F 9/445 |
| | | | | 714/36 |
| 2006/0143606 | A1* | 6/2006 | Smith | G06F 21/6218 |
| | | | | 717/175 |
| 2009/0113444 | A1* | 4/2009 | Hackborn | G06F 9/461 |
| | | | | 719/312 |
| 2009/0217258 | A1* | 8/2009 | Wenzinger | G06F 8/62 |
| | | | | 717/173 |
| 2010/0138834 | A1* | 6/2010 | Agarwal | G06F 9/4843 |
| | | | | 718/100 |
| 2011/0113229 | A1* | 5/2011 | Itoh | G06F 9/4418 |
| | | | | 713/2 |
| 2011/0209219 | A1* | 8/2011 | Zeitlin | G06F 21/56 |
| | | | | 726/23 |
| 2011/0296416 | A1* | 12/2011 | Kim | G06F 11/328 |
| | | | | 718/100 |
| 2012/0167117 | A1* | 6/2012 | Kekeh | G06F 9/485 |
| | | | | 719/318 |
| 2012/0209923 | A1* | 8/2012 | Mathur | G06F 21/53 |
| | | | | 709/206 |
| 2012/0210321 | A1* | 8/2012 | Silva | H04W 4/60 |
| | | | | 718/100 |
| 2012/0260118 | A1* | 10/2012 | Jiang | G06F 9/4843 |
| | | | | 713/340 |
| 2012/0291103 | A1* | 11/2012 | Cohen | G06F 21/6218 |
| | | | | 726/4 |
| 2012/0324481 | A1* | 12/2012 | Xia | G06F 9/485 |
| | | | | 719/320 |
| 2013/0036299 | A1* | 2/2013 | Itoh | G06F 9/4401 |
| | | | | 713/2 |
| 2013/0047198 | A1* | 2/2013 | Srour | G06F 9/485 |
| | | | | 726/1 |
| 2013/0102300 | A1 | 4/2013 | Sigal et al. | |
| 2013/0212600 | A1* | 8/2013 | Harsh | G06F 9/50 |
| | | | | 719/318 |
| 2013/0263127 | A1* | 10/2013 | y Arcas | G06F 9/542 |
| | | | | 718/1 |
| 2013/0304778 | A1* | 11/2013 | Vanderhallen | G06F 16/192 |
| | | | | 707/831 |
| 2013/0347002 | A1* | 12/2013 | Basu | G06F 9/485 |
| | | | | 718/107 |
| 2014/0007106 | A1* | 1/2014 | Weksler | G06F 9/485 |
| | | | | 718/100 |
| 2014/0136607 | A1* | 5/2014 | Ou | H04L 67/18 |
| | | | | 709/203 |
| 2014/0143791 | A1* | 5/2014 | Mark | G06F 9/485 |
| | | | | 719/318 |
| 2014/0298272 | A1* | 10/2014 | Doan | G06F 3/017 |
| | | | | 715/863 |
| 2014/0325518 | A1* | 10/2014 | Kim | G06F 9/485 |
| | | | | 718/102 |
| 2014/0337588 | A1* | 11/2014 | Sakai | G06F 3/0604 |
| | | | | 711/154 |
| 2014/0337611 | A1 | 11/2014 | Kuscher et al. | |
| 2015/0293752 | A1* | 10/2015 | Varma | G06F 8/42 |
| | | | | 717/149 |
| 2015/0378742 | A1* | 12/2015 | Harrington | G06F 9/542 |
| | | | | 719/318 |
| 2016/0110283 | A1* | 4/2016 | Iyigun | G06F 12/084 |
| | | | | 711/130 |
| 2016/0132344 | A1* | 5/2016 | Funk | G06F 9/44578 |
| | | | | 719/328 |
| 2016/0239340 | A1* | 8/2016 | Chauvet | G06F 9/4881 |
| 2016/0378556 | A1* | 12/2016 | Luo | G06F 9/5016 |
| | | | | 719/328 |
| 2017/0083166 | A1* | 3/2017 | Chen | G06F 9/461 |
| 2017/0142124 | A1* | 5/2017 | Mukhin | G06F 21/30 |
| 2017/0185788 | A1* | 6/2017 | Qiu | G06F 21/566 |
| 2017/0208137 | A1* | 7/2017 | Kirkpatrick | G06F 8/65 |
| 2017/0286171 | A1* | 10/2017 | Apparao | G06F 9/5016 |
| 2017/0330248 | A1* | 11/2017 | Gomariz | G06Q 30/0272 |
| 2018/0077243 | A1* | 3/2018 | Mathew | H04L 67/143 |
| 2018/0157498 | A1* | 6/2018 | Borlick | G06F 3/0659 |
| 2020/0026405 | A1* | 1/2020 | Lemay | G06F 3/0488 |

OTHER PUBLICATIONS

"Autorun Manager", Retrieved from: https://web.archive.org/web/20130114164411/https:/play.google.com/store/apps/details?id=com.rs.autorun&hl=en, Jan. 14, 2013, 2 Pages.

"Configure Applications to Always Run as an Administrator", Retrieved from: https://web.archive.org/web/20161202093000/https:/technet.microsoft.com/en-us/library/ff431742.aspx, Dec. 2, 2016, 2 Pages.

"Keeping the application running in the background", Retrieved from: https://www.ibm.com/support/knowledgecenter/en/SSHS8R_7.1.0/com.ibm.worklight.dev.doc/devref/t_keeping_app_running_in_background.html, Retrieved on: Apr. 17, 2018, 2 Pages.

"PM2", Retrieved from: https://web.archive.org/web/20151209115442/http:/pm2.keymetrics.io/docs/usage/pm2-doc-single-page/, Dec. 9, 2015, 32 Pages.

Fidanov, Stefan, "Running your Node & Express apps forever, no matter what, with Systemd and PM2", Retrieved from: https://www.terlici.com/2015/06/20/running-node-forever.html, Jun. 20, 2015, 7 Pages.

"Kiosk Apps—Google Chrome", Retrieved from: https://web.archive.org/web/20170313131845/https://developer.chrome.com/apps/manifest/kiosk_enabled, Mar. 13, 2017, 3 Pages.

"International Search Report and Written Opinion Issued in PCT Application No. PCT/US19/033636", dated Jul. 22, 2019, 11 Pages.

* cited by examiner

OPERATING SYSTEM SERVICE FOR PERSISTENTLY EXECUTING PROGRAMS

BACKGROUND

A developer of a computer program may wish to ensure that the program is persistently executed without being terminated. However, existing approaches to configuring a program for persistent execution on a given computer system may require an administrator of the computer system to specifically configure the computer system for persistently executing the program. As such, configuring the program for persistent execution may require intervention by an administrator of the computer system, so the developer may be unable to ensure that the program will be persistently executed. Furthermore, typical approaches to persistently executing programs entail locking the computer system in a fixed configuration so as to prevent subsequent reconfiguration without further administrator intervention. Thus, a system configured for persistently executing a program may not allow a user and/or developer to change behavior of the system (e.g., by configuring the system to use updated software provided by the developer). As such, typical approaches to persistently locking programs on a computer system may hamper other functionality of the computer system.

SUMMARY

An operating system service for persistently executing programs comprises a registration service configured to register a manifest defining a persistence mode of a user-controllable program. The operating system service further comprises a runtime service configured, based on the persistence mode defined via the manifest, to detect and reject termination requests for the program, and to detect that the program has terminated and restart execution of the program.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
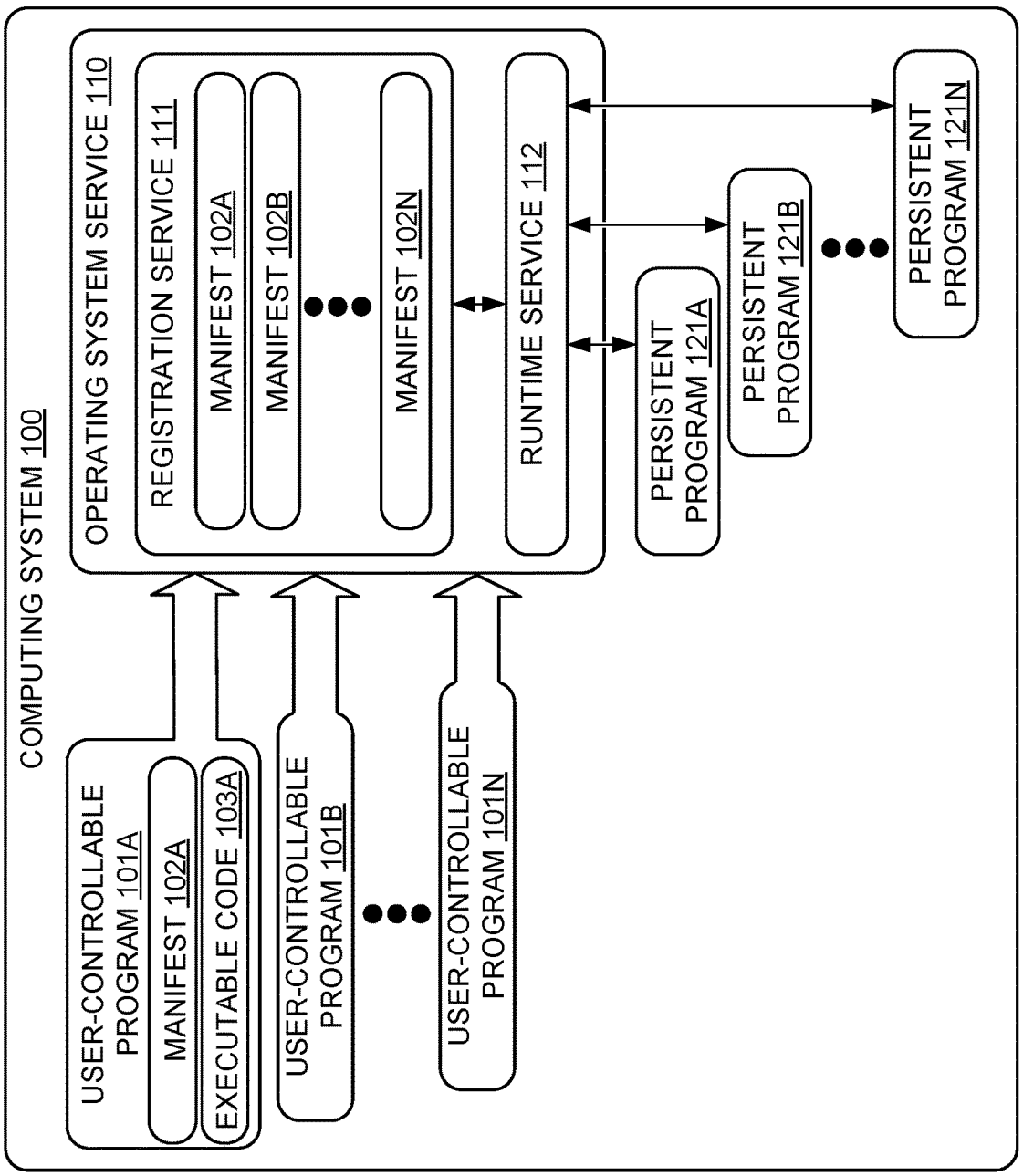
FIG. 1 shows an exemplary computing system including an operating system service configured to persistently execute programs.

FIG. 1 depicts relevant aspects of a computing system 100 configured to persistently execute one or more programs, e.g., user-controllable program 101A, user-controllable program 101B, and further user-controllable programs through user-controllable program 101N. Computing system 100 may execute any suitable user-controllable programs, e.g., graphical programs, command-line programs, background services, user environment features (e.g., programs for visually presenting graphical menus, desktop widgets, notification icons, etc.), and/or any other suitable user-controllable program(s). Computing system 100 may be generally configured as any suitable computing system, e.g., an enterprise computer system, a personal computer device, a mobile phone device, etc.

User-controllable program 101A includes executable code 103A. Executable code 103A may be any appropriate instructions defining how to carry out the user-controllable program. Although not shown, user-controllable program 101B similarly includes executable code, and further user-controllable programs (e.g., user-controllable program 101N) each include corresponding executable code.

"User-controllable program" may be used herein to refer to any program which is executable and controllable by a user of computing system 100 without having elevated security credentials (e.g., administrator credentials). In other words, a user (e.g., a non-administrator user of an enterprise computer system or a guest user of a personal computer system) may be able to 1) control the program by interacting with the program; 2) install the program and/or uninstall the program; and/or 3) change configuration settings of the program. In contrast, "administrator-controllable program" may be used herein to refer to any program which can only be executed, controlled, installed/uninstalled, and/or configured by a user of the computing system 100 having an elevated credential (e.g., a system administrator).

Examples of elevated credentials that may be required by administrator-controllable programs include: 1) making system calls requiring an elevated credential (e.g., system call to kill another process); 2) accessing protected disk, memory, and/or network resources. Accordingly, user-controllable programs include programs that do not require some or all of such elevated credentials. In some examples, computing system 100 may recognize when a program is user-controllable or administrator controllable based on instructions defining the program. Accordingly, when the program includes any instructions requiring an elevated credential (e.g., an instruction to write to a protected address in memory), the program may be recognized as administrator-controllable, and when the program does not contain any such instructions, it may be recognized as user-controllable. Alternately or additionally, a developer of a program may explicitly indicate that it is an administrator-controllable program (whether or not the program includes any particular instruction that is recognized as needing administrator credential).

A developer of a user-controllable program 101A may wish to partially constrain execution of user-controllable program 101A while still allowing users to substantially control user-controllable program 101A (e.g., to install the program, execute the program, and/or change configuration settings of the program). Accordingly, the developer may specify such constraints in a manifest 102A included with the user-controllable program 101A. Additionally or alternately, an administrator of computing system 100 may specify such constraints in manifest 102A. Although not shown, user-controllable program 101B similarly includes manifest 102B and user program 101N includes manifest 102N.

Manifest 102A defines characteristics of user-controllable program 101A. Non-limiting examples of characteristics that may be specified in manifest 102A include: 1) user-controllable program 101A should be executed persistently (e.g., the program should not be terminated); 2) user-controllable program 101A should be executed at startup; 3) more generally, user-controllable program 101A should be executed at a particular time during operation of computing system 100, e.g., after user login, or before shutdown; 4) user-controllable program 101A should be executed as a dependency of another program (e.g., as a dependency of user-controllable program 101B); 5) user-controllable program 101A should not be executed concurrently with another particular user-controllable program (e.g., because the two programs are incompatible); and/or 6) user-controllable program 101A should not be executed at all and/or requires administrator privileges to execute.

By defining constraints of a user-controllable program in a manifest, a developer of the user-controllable program can indicate how the user-controllable program is to be used without requiring elevated credentials for using the program (e.g., so that the program remains user-controllable). For example, the developer may indicate that user-controllable program 101A should be executed persistently without terminating (e.g., when correct and/or efficient execution of the program requires the program to be executed persistently). In some examples, the user-controllable program may be installed/uninstalled by a user, e.g., by accessing a software repository/store including a plurality of different user-controllable programs that may be installed/uninstalled without any elevated credential. For example, the software repository may include software which has been previously been vetted by a purveyor of computing device 100, e.g., to ascertain that the software is correct, secure, or more generally appropriate for execution on computing device 100 according to any suitable criteria. Accordingly, although user-controllable program 101A may be installed/uninstalled, executed, and/or configured by a user without supplying an administrator credential, termination of user-controllable program 101A may be prevented so as to ensure the persistent execution of user-controllable program 101A. Constraints of user-controllable program 101A may be concisely defined in manifest 102A which may reduce a developer effort as compared to modifying source code and/or executable code of the program in order to cause the modified executable code to satisfy the constraints. Manifest 102A may specify constraints of user-controllable program 101A in any suitable manner. For example, manifest 102A may include one or more keywords each defining a constraint, e.g., a keyword "persistent" specifying that user-controllable program 101A should be executed persistently and/or a keyword "startup" specifying that user-controllable program 101A should be executed at startup.

In an example, user-controllable program 101A is a background service which is executable without a graphical user interface. The background service may run in the background so as to provide functionality for other programs (e.g., for scheduling and/or monitoring activities of the other programs). Accordingly, the background service may be configured for persistent execution, so as to ensure the provided functionality is persistently available. Alternately or additionally, the background service may be configured to run at startup of computing system 100, so that the background service is available after startup.

Computing system 100 is configured to execute an operating system service 110 for executing user-controllable programs according to associated manifests, thereby enforcing constraints set for each program. For example, operating system service 110 may facilitate persistent execution of user-controllable program 101A according to manifest 102A. In some examples, operating system service 110 may be a component of an operating system running on computing system 100, in any suitable context (e.g., desktop computer with graphical user environment, server computer with web application environment, server computer with remote login capability and text/command-line environment, mobile phone, etc.).

Operating system service 110 includes a registration service 111 configured to register, for each program of a plurality of different user-controllable programs, a manifest defining a persistence mode for the program. For example, registration service 111 registers manifest 102A defining a persistence mode for user-controllable program 101A. Similarly, registration service 111 registers manifests 102B through 102N defining persistence modes for further user-controllable programs 101B through 101N. Registration service 111 may register a manifest for a program at any suitable time. For example, registering the manifest may be performed automatically while installing the program. Alternately, registering the manifest may be performed responsive to an administrator command received by registration service 111, e.g., a command for adding or replacing a manifest for a previously installed program, and/or a command for temporarily registering a manifest for a program (e.g., during development of such program).

Operating system service 110 further includes a runtime service 112 configured to execute a plurality of persistent programs based on the plurality of user-controllable programs, e.g., persistent program 121A based on user-controllable program 101A, persistent program 121B based on user-controllable 101B, through persistent program 121N based on user-controllable program 101N. For example, persistent program 121A is a program that generally has the behavior of program 101A, subject to constraints defined via manifest 102A. Runtime service 112 is configured to communicate with registration service 111 in order to oversee the execution of persistent programs 121A through 121N based on manifests 102A through 102N registered with registration service 111.

Runtime service 112 is generally configured to oversee execution of programs. For example, runtime service 112 may handle any requests to execute programs (e.g., commands issued by users and/or other programs of the operating system). Accordingly, runtime service 112 may manage such execution of the program based on a manifest of the program (e.g., by communicating with registration service 111 to obtain relevant details defined in the manifest or by accessing storage associated with registration service 111 to read a stored copy of the manifest) and accordingly, executing the instructions of the program, subject to constraints set by the persistence mode defined via the manifest.

In some examples, a persistence mode indicates that a program is a startup program. Accordingly, runtime service 112 is configured to automatically start the program responsive to booting the operating system utilizing runtime service 112. In some examples, runtime service 112 may automatically start the program at a particular stage in a boot process of the operating system, e.g., as soon as operating system service 110 and runtime service 112 begin execution. In some examples, runtime service 112 may start the program after a boot process has completed, e.g., after a user logs in to a graphical user environment.

In one example, the program is an email program that is designed to always run in the background so as to receive up-to-date emails. Another example is a scheduling program that is designed to always run in the background so as to execute other programs and/or show notifications according to a schedule. Still another example is a multimedia program for a kiosk computing environment that is designed to always be shown at a display of the kiosk so as to visually present information to users of the kiosk.

In some examples, the persistence mode defined via the manifest indicates the program is a prerequisite program satisfying a dependency of a different, dependent program. In one example, a dependent program is an email front-end client with a graphical user interface for reading/composing emails, and a prerequisite program is an email back-end service that synchronizes stored messages with messages stored at a remote server, and provides the synchronized messages to the email front-end client. Accordingly, runtime service 112 is configured to automatically start execution of the prerequisite program responsive to a request to start the dependent program, so as to satisfy the dependency. In some examples, a manifest of a prerequisite program may indicate one or more dependent programs that the prerequisite program is required by (e.g., by listing such dependent program(s)). In some examples, a manifest of a dependent program may indicate one or more prerequisite programs that the dependent program requires (e.g., by listing such prerequisite programs). Accordingly, when starting the dependent program, runtime service 112 is configured to automatically recognize the dependency based on the manifest(s) and to automatically start the prerequisite program. More generally, a plurality of different programs may be designed to run cooperatively. Accordingly, the manifest(s) for one or more of the programs may indicate a mutual dependency among the plurality of different programs (e.g., by listing programs that are mutually dependent), and runtime service 112 is configured to recognize such mutual dependency based on the manifest(s) and to automatically start all of the mutually dependent programs whenever starting any one of the mutually dependent programs.

An example of a prerequisite program is an email synchronization service, with a dependent program being a graphical user interface program for checking and/or composing emails. Accordingly, runtime service 112 may automatically start the email synchronization service whenever the graphical user interface program is started, so that emails may be received and/or sent via cooperation with the email synchronization service. In another example, a prerequisite program could be a cloud file synchronization service, with the dependent program being an office suite program that saves changes to files and backs up and/or updates remote copies of the changed files via the cloud file synchronization service. Accordingly, runtime service 112 may automatically start the cloud file synchronization service whenever the office suite program is started. In a similar manner, manifest(s) of one or more cooperating computer programs may define any suitable dependency between the cooperating computer programs; accordingly, runtime service 112 is configured to automatically start the programs in a suitable order so as to satisfy such dependencies.

For example, runtime service 112 is configured to oversee execution of persistent program 121A by executing the executable code 103A of user-controllable program 101A, while overseeing such execution to ensure conformance to constraints defined via manifest 102A. In some examples, runtime service 112 may be configured to automatically start persistent program 121A at startup of computing system 100. Alternately or additionally, runtime service 112 may be configured to ensure persistent execution of persistent program 121A by preventing termination of persistent program 121A.

Figure 2:
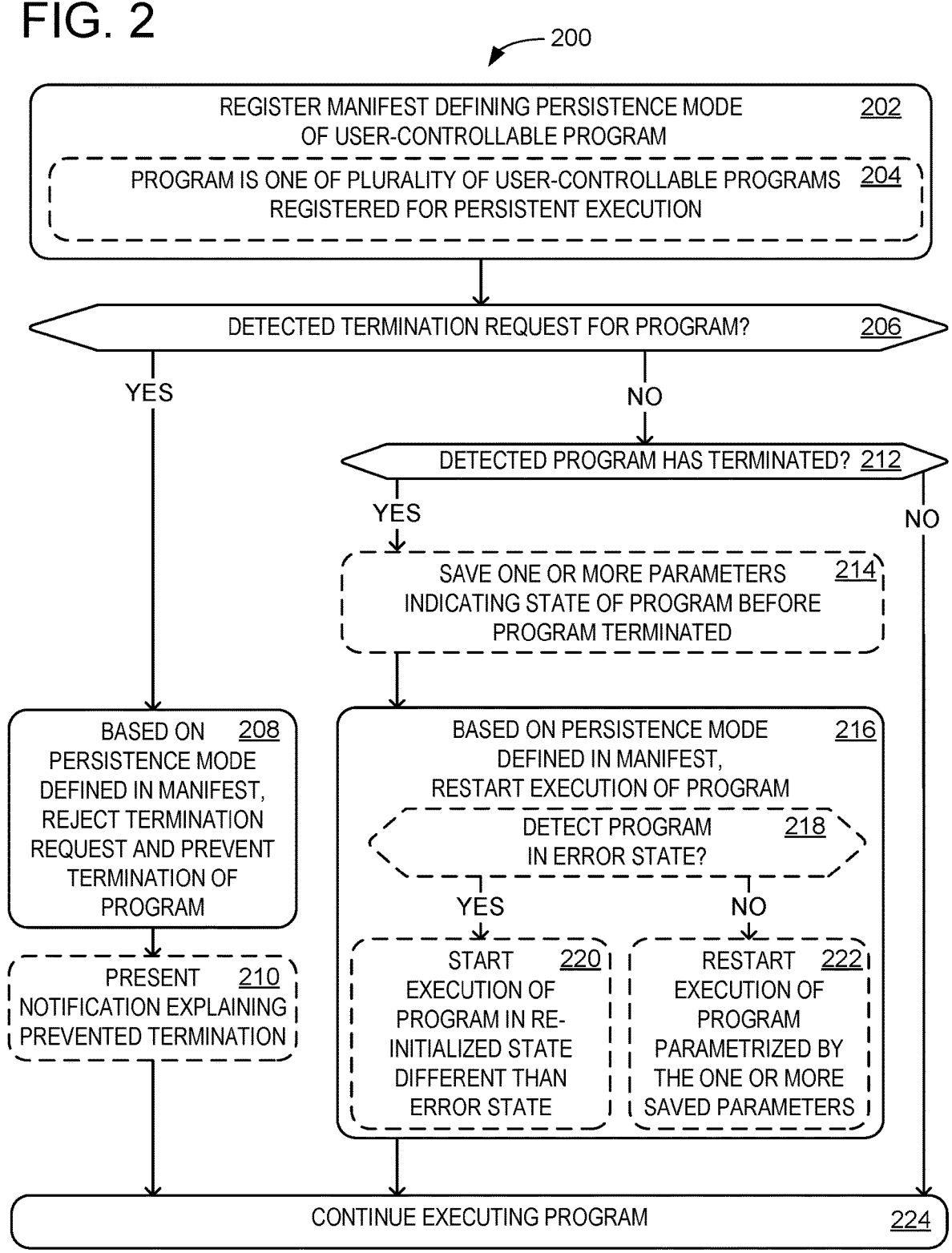
FIG. 2 shows an exemplary method for persistently executing programs.

Accordingly, FIG. 2 shows an exemplary method 200 for persistently executing programs. Method 200 may be performed by any suitable computing system, e.g., by computing system 100.

At 202, method 200 includes registering a manifest defining a persistence mode of a user-controllable program, e.g., by operating registration service 111 of FIG. 1 to register such manifest. Optionally, in some examples, at 204, the program is one of a plurality of user-controllable programs registered for persistent execution (e.g., user-controllable programs 101A through 101N as shown in FIG. 1); accordingly, each such program may be registered with registration service 111. After registration of the program, method 200 facilitates persistent execution of the program based on a persistence mode defined in the manifest. For example, method 200 may be suitable for ensuring persistent execution of a persistent program (e.g., persistent program 121A) when a corresponding manifest (e.g., manifest 102A) indicates persistent execution (e.g., by including a "persistent" keyword).

At 206, method 200 includes detecting whether a termination request for the program has occurred. Based on the persistence mode defined via the manifest for the program, and in the event of detecting a termination request for the program during execution of the program, at 208, method 200 includes rejecting the termination request and preventing termination of the program. For example, returning briefly to FIG. 1, runtime service 112 is configured to detect the termination request and prevent termination of the program.

In some examples, a termination request is a termination command input via a graphical user interface of the program. Accordingly, runtime service 112 may detect such termination command and prevent termination of the program. In some examples, a graphical user interface of a program is implemented using one or more operating system software libraries (e.g., a library for launching graphical applications in a graphical user environment, and/or a library for integrating a graphical program with a window manager program). Accordingly, at least some methods of terminating the program may be implemented via such operating system libraries. For example, a typical graphical user interface program is configured to provide one or more graphical user interface affordances (e.g., buttons, menus, hotkeys, etc.), for interacting with the operating system, which may be implemented via operating system libraries. Operating system service 110 and runtime service 112 may detect such interaction via the operating system libraries. Accordingly, in the event that a user requests termination of a persistent program via a graphical user interface affordance, runtime service 112 is configured to intercept such request and to prevent termination.

In some examples, the termination request sent to a running program is an external termination signal received from a different program. (e.g., a kill signal from a task manager program). For example, the external signal may be received via an operating system call, via a software bus, or via any other suitable protocol for inter-process communication. Accordingly, runtime service 112 is configured to intercept such signals. Runtime service 112 may be configured, responsive to intercepting a signal requesting termination, to block the signal (e.g., so that the running program to which the signal was sent does not receive any signal). Alternately, runtime service 112 may be configured, responsive to intercepting the signal requesting termination, to send an alternative signal (e.g., a signal requesting temporary suspension of processing by the running program, or a signal indicating that termination was requested but is being prevented).

More generally, runtime service 112 may be configured to intercept possible termination requests in any suitable manner. For example, runtime service 112 may inject one or more executable instructions into executable code 103A of a persistent program 121A, replacing and/or adding instructions for modified executable code of persistent program 121A. Such added instructions may modify and/or replace instructions of persistent program 121A that would otherwise cause persistent program 121A to terminate. Registration service 111 and runtime service 112 may cooperate to recognize sequences of instructions that may possible lead to termination in order to update executable code of persistent programs accordingly. For example, runtime service 112 may recognize, at program load time, one or more instructions (e.g., function calls) corresponding to methods for terminating a program supplied by programming libraries/frameworks, e.g., function calls corresponding to handling a request to close a program issued by a user via a close button of a graphical user interface. Accordingly, runtime service 112 may recognize a variety of different sequences of instructions that indicate termination, in order to detect and prevent such termination.

At 210, method 200 optionally includes presenting a notification explaining that termination of the program was prevented by runtime service 112. Such notification may be presented in any suitable manner, e.g., visual presentation of a tooltip, dialog box, or notification displayed in corner of screen, and/or audio presentation of a beep sound, chime sound, or speech audio output.

At 224, method 200 includes continuing execution of the program. Accordingly, by rejecting the termination request and preventing termination of the program at 208 and continuing execution at 224, the program is persistently executed, despite the termination request.

At 212, method 200 includes detecting whether the program has terminated (e.g., whether the program may have terminated despite no termination request having been detected at 206). If the program has not terminated, method 200 includes continuing execution of the program at 224.

In the event of detecting that the program has terminated, based on the persistence mode defined via the corresponding manifest, runtime service 112 is configured to restart execution of the program, thereby mitigating any interruption to persistent execution of the program.

At 214, method 200 optionally includes saving one or more parameters indicating a state of the program before the program terminated. In some examples, saving the one or more parameters includes continually saving state and/or configuration parameters of the program throughout execution of the program (e.g., runtime service 112 may continually save "snapshots" of at least a portion of memory in an address space of the program periodically or according to any suitable schedule throughout execution of the program). In some examples, saving the one or more parameters includes retrieving, from a storage device of computing system 100, a saved state and/or configuration of the program that was previously output by the program. In some examples, saving the one or more parameters includes analyzing a runtime state of the program before or shortly after termination (e.g., by analyzing at least a portion of memory in an address space of the program before termination, or after termination but before the program is unloaded from such address space by computing system 100). Alternately or additionally, saving the one or more parameters may be performed in any suitable manner, e.g., by analyzing and/or re-using data associated with the program from a core dump emitted when the program terminated.

At 216, method 200 includes, based on the persistence mode defined in the manifest, restarting execution of the program. At 218, restarting execution of the program optionally includes detecting whether the program is in an error state. Detecting an error state of the program may be performed in any suitable manner, e.g., based on the saved parameters, based on a signal output by the program upon termination, or based on any other suitable data associated with the execution of the program.

At 220, restarting execution of the program optionally includes, in the event that an error state is detected, starting execution of the program in a re-initialized state different than the error state. For example, the re-initialized state may be a default state of the program, a previously saved state corresponding to a working configuration of the program, or any other suitable state for re-initializing the program. By starting the program with a re-initialized state different than the error state, runtime service 112 may avoid a situation in which a program terminates due to an error and is restarted in a state that would cause the same error to occur.

At 222, restarting execution of the program optionally includes, if an error state was not detected, restarting execution of the program, with execution being parametrized by the one or more saved parameters. By re-using the saved parameters, the program may be able to restart execution in a same or at least partially similar state to a previous execution Accordingly, when the program is terminated without any error (e.g., due to a signal not caught by runtime service 112 at 206), by restarting execution of the program in a similar state, runtime service 112 may mitigate any interruption to tasks being performed by the program.

After restarting execution of the program at 216, method 200 includes continuing execution of the program at 224. Accordingly, by restarting and continuing execution, the program is persistently executed, mitigating any interruption caused by termination of the program. Accordingly, method 200 may robustly restart a program when it is interrupted for any reason. When the reason was an error, method 200 may restart the program in a fresh, re-initialized state to avoid errors. When not from an error, method 200 may restart the program so that it can resume previous work.

Although FIG. 2 depicts detecting termination of the program at 212 after first detecting a termination request at 206, detecting termination and detecting termination requests may be performed simultaneously or in any suitable order, e.g., detecting termination at 212 before detecting termination requests at 206.

Runtime service 112 may continually monitor the program for occurrence of termination and/or receiving a termination request, e.g., by repeatedly monitoring the program according to method 200. In addition to persistently executing the program via runtime service 112, runtime service 112 may be operated with regard to one or more other programs of a plurality of user-controllable programs (e.g., a plurality of user-controllable programs registered with registration service 111), so as to persistently execute each other program with runtime service 112 (by detecting/rejecting termination requests for each program and/or to restarting execution of any program for which termination is detected).

Although FIG. 1 and FIG. 2 describe registry and execution of user-controllable programs, operating system service 110 may further be used to register and execute any suitable programs, e.g., administrator-controllable programs. Similarly, although FIG. 1 depicts a plurality of user-controllable programs being executed as persistent programs, operating system service 110 and method 200 may be used to execute a single user-controllable program.

In addition to facilitating the persistent execution of persistent programs, operating system service 110 may constrain execution of a program in any other suitable manner based on a persistence mode defined in a manifest for the program. In an example, a persistence mode defined by a manifest indicates that a program has a persistent graphical user interface. Accordingly, runtime service 112 is configured, based on the persistence mode defined via the manifest, and in the event of detecting a request to hide a graphical user interface of the program, to reject such request and prevent hiding the graphical user interface. "Hiding" a graphical user interface may include any or all of minimizing the graphical user interface to a task bar and/or notification area, moving the graphical user interface to a separate virtual desktop of a graphical user environment, or any other manner in which a graphical user interface may be temporarily and/or permanently hidden from view. In some examples, a persistence mode defined in a manifest may indicate that a program may be hidden via some mechanisms provided by a graphical user environment (e.g., moving the program to a separate virtual desktop) while prohibiting other mechanisms for hiding the program (e.g., minimizing the program to a task bar). In an example, a program is a multimedia program configured to be persistently displayed at a kiosk computer (e.g., so as to limit use of the kiosk computer to interaction with the multimedia program). Accordingly, a manifest for the program may define a persistence mode indicating that the program has a persistent graphical user interface that should not be hidden.

In another example, registration service 111 may register a program with a manifest prohibiting execution of the program. Accordingly, runtime service 112 may be configured, in the event of detecting a request to start execution of the program, to reject such request and prevent execution of the program. For example, execution of the program may be prohibited due to an incompatibility with another program. In an example, a program is a task manager program on a kiosk computer. An administrator of the kiosk computer may wish to prohibit use of the task manager program, e.g., to avoid exposing unnecessary details to users of the kiosk computer and to prevent changing configuration of the kiosk computer via the task manager. Accordingly, the administrator may use runtime service 112 to register a manifest for the task manager program, indicating that operation of the task manager program is prohibited. In this manner, the administrator may protect against unwanted use of the task manager program, without needing to fully uninstall the task manager program (e.g., enabling the administrator to use the task manager program when necessary by temporarily registering a new and/or modified manifest for the task manager program).

In an example, a first program and a second program are mutually incompatible implementations of cloud file synchronization services. Although each program may be operated independently, an incompatibility between the programs (e.g., contention over disk and/or network resource usage) may render the programs inoperable in conjunction. Accordingly, runtime service 112 may allow executing either program separately, but may reject a request to start either program when the other is already running. In this manner, runtime service 112 may allow each program to be used, while reducing a chance of an error resulting from using both programs simultaneously.

Figure 3:
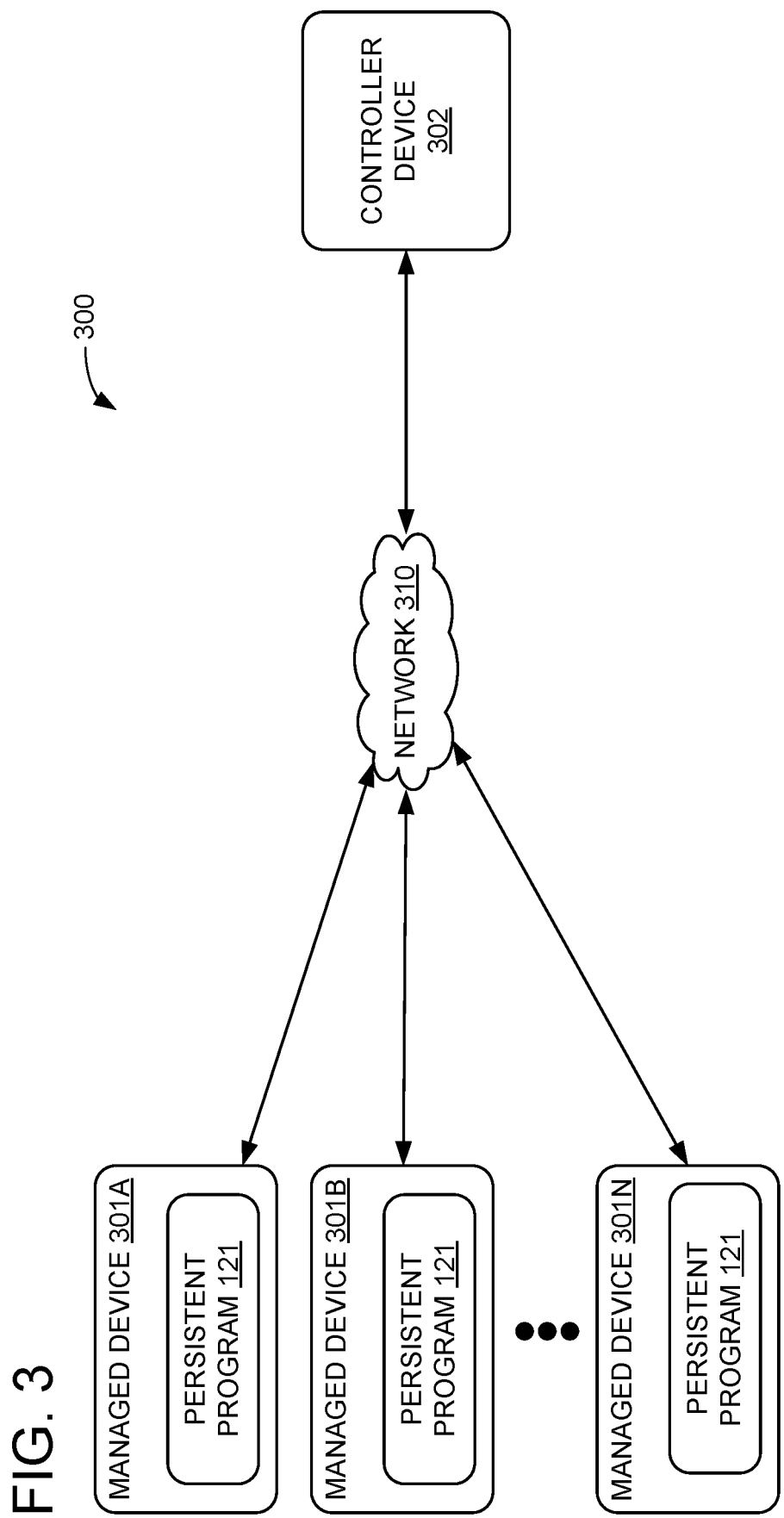
FIG. 3 shows an example use scenario wherein a controller device is used to coordinate a plurality of managed devices executing a persistent program.

FIG. 3 shows a further example use scenario enabled by persistently executing programs, in the form of a computing environment 300. Computing environment 300 includes a plurality of managed devices, e.g., managed device 301A, managed device 301B, through managed device 301N. Each of the managed devices is an example of the computing system 100 of FIG. 1, configured to operate an operating system service 110 in order to register a manifest for a persistent program 121 at registration service 111, and to operate runtime service 112 to persistently execute an instance of a common persistent program 121 (e.g., according to method 200). The managed devices are communicatively coupled, via a network 310, to a controller device 302. Network 310 may be any suitable computer network, e.g., the internet or a local intranet. Controller device 302 may be any suitable computing device. In some examples, the managed devices are further communicatively coupled to each other, and/or to other computing devices.

Persistent program 121 is configured to communicatively couple to a controller program executing on controller device 302 and to receive, from the controller program, a request to execute persistent program 121 according to a new configuration. Accordingly, persistent program 121 is further configured to continue executing according to the new configuration. In this manner, the controller program on controller device 302 manages the behavior of each managed device 301A through 100N, by supplying appropriate configurations for persistent program 121 running on the managed devices. Controller device 302 may configure persistent program 121 in order to coordinate activities of the managed devices in any suitable manner. For example, controller device 302 may configure persistent program 121 to visually present content, facilitate communication (e.g., by providing a text messaging service accessible to each of the managed devices in the form of a "chat room"), monitor activities of the managed devices (e.g., by determining what other programs are being executed on the managed devices), configuring further programs of the managed devices with further manifests defining any suitable persistence mode (e.g., configuring programs for persistent execution, or configuring programs to prohibit execution), etc.

In an example, computing environment 300 includes computer devices associated with a classroom setting. For example, managed devices 100A through 100N may be computing devices assigned to students in the classroom (e.g., laptops, mobile devices, or any other suitable devices). Accordingly, controller device 302 may be a computing device of a teacher in the classroom, which is configured to coordinate activities using the managed devices. Accordingly, a networking program for connecting to controller device 302 may be a persistent program 121 installed on each managed device. Based on a manifest associated with the networking program, the networking program may be configured to run at startup and/or to run persistently. In some examples, the networking program may be a dependency of a graphical user interface for classroom activities. Accordingly, the networking program may be configured to run whenever the graphical user interface for classroom activities is launched. Controller device 302 may be generally configured to control the managed devices via persistent program 121, e.g., by launching new programs, killing programs, and/or modifying state data of running programs. In some examples, controller device 302 may be able to remotely log in to managed devices in order to provide inputs and/or monitor graphical outputs of the managed devices (e.g., acting as a remote desktop program). For example, the teacher may use controller device 302 to help a student to find a program that will be used for an activity. For example, the teacher may use controller device 302 to input data to help a student fill in part of an assignment.

For example, the teacher may wish for all of the managed devices to coordinately run a classroom program. The classroom program may be configured to present content (e.g., displaying slides, presenting interactive activities, and/or electronic testing programs). Alternately or additionally, the classroom program may be configured to facilitate communication between the students and teacher, e.g., allowing a student to pose a textual question in order to receive assistance from the teacher, or allowing students to pose textual questions to each other in order to collaborate on a classroom activity. Alternately or additionally, the classroom program may allow the teacher to monitor activities of the managed devices (e.g., to detect when a managed device is idle, so as to provide assistance to a student who may be stuck, and/or to detect programs being used at the managed devices to ensure that students are engaging in relevant activities using the managed devices).

In some examples, the teacher may wish to prohibit the students from operating certain programs on their managed devices, e.g., to prohibit the students from operating a web browser program. In some examples, the teacher may wish to prohibit certain programs only at certain times, e.g., a web browser program may be prohibited during a lecture, while being allowed during a collaborative research activity. Accordingly, the teacher may use controller device 302 to configure persistent program 121 and operating system service 110 executing on each managed device to prohibit execution of one or more programs. For example, the teacher may temporarily prohibit use of a web browser program by registering a new manifest for the web browser program. Alternately or additionally, the teacher may register a manifest for the web browser program that indicates an incompatibility with a different application, e.g., a graphical user interface for classroom activities, so that the web browser program may be launched in general, while being prohibited while the graphical user interface for classroom activities is in operation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 4:
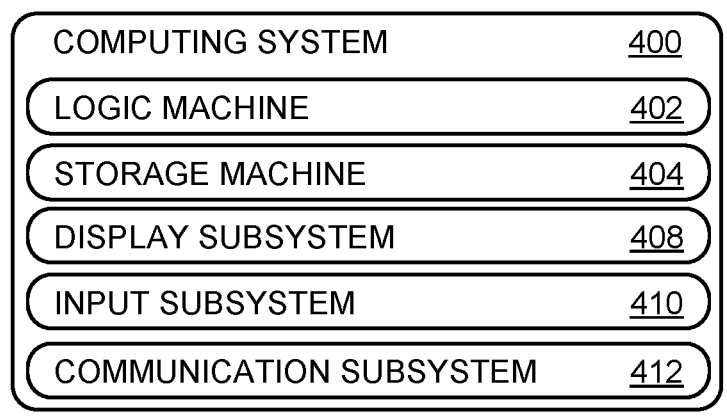
FIG. 4 shows an exemplary computing system.

FIG. 4 schematically shows a non-limiting embodiment of a computing system 400 that can enact one or more of the methods and processes described above (e.g., method 200). Computing system 400 is shown in simplified form. Computing system 400 may take the form of one or more personal computers, server computers, tablet computers, home-entertainment computers, network computing devices, gaming devices, mobile computing devices, mobile communication devices (e.g., smart phone), and/or other computing devices. For example, computing system 400 may be a computing system 100 configured to persistently execute programs via an operating system service 110 including a registration service 111 and a runtime service 112. Alternately or additionally, computing system 400 may be a managed device 301A, and/or a controller device 302.

Computing system 400 includes a logic machine 402 and a storage machine 404. Computing system 400 may optionally include a display subsystem 408, input subsystem 410, communication subsystem 412, and/or other components not shown in FIG. 4.

Logic machine 402 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 404 includes one or more physical devices configured to hold instructions executable by the logic machine to implement the methods and processes described herein. When such methods and processes are implemented, the state of storage machine 404 may be transformed—e.g., to hold different data.

Storage machine 404 may include removable and/or built-in devices. Storage machine 404 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 404 may include volatile, nonvolatile, dynamic, static, read/write, read-only, random-access, sequential-access, location-addressable, file-addressable, and/or content-addressable devices.

It will be appreciated that storage machine 404 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 402 and storage machine 404 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 implemented to perform a particular function. In some cases, a module, program, or engine may be instantiated via logic machine 402 executing instructions held by storage machine 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 408 may be used to present a visual representation of data held by storage machine 404. This visual representation may take the form of a graphical user interface (GUI). As the herein described methods and processes change the data held by the storage machine, and thus transform the state of the storage machine, the state of display subsystem 408 may likewise be transformed to visually represent changes in the underlying data. Display subsystem 408 may include one or more display devices utilizing virtually any type of technology. Such display devices may be combined with logic machine 402 and/or storage machine 404 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 412 may be configured to communicatively couple computing system 400 with one or more other computing devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 400 to send and/or receive messages to and/or from other devices via a network such as the Internet.

In an example, a computing device configured to persistently execute programs, comprises: a logic machine; and a storage machine holding instructions executable by the logic machine to: operate a registration service configured to register a manifest defining a persistence mode for each program of a plurality of user-controllable programs; and operate a runtime service configured, for each program of the plurality of user-controllable programs, to: based on the persistence mode defined via the manifest, and in the event of detecting a termination request for the program during execution of the program, reject such request and prevent termination of the program; and based on the persistence mode defined via the manifest, and in the event of detecting that the program has terminated: save one or more parameters indicating a state of the program before the program terminated; and restart execution of the program, wherein such execution is parametrized by the one or more saved parameters. In this example or any other example, detecting the program has terminated includes detecting that the program is in an error state, and wherein restarting execution of the program includes starting execution of the program in a re-initialized state different than the error state. In this example or any other example, the program is configured to: communicatively couple with a controller program; receive, from the controller program, a request to execute the program according to a new configuration; and continue executing the program according to the new configuration.

In an example, a computing device configured to persistently execute programs, comprises: a logic machine; and a storage machine holding instructions executable by the logic machine to: operate a registration service configured to register a manifest defining a persistence mode of a user-controllable program; and operate a runtime service configured to: based on the persistence mode defined via the manifest, and in the event of detecting a termination request for the program during execution of the program, reject such request and prevent termination of the program; and based on the persistence mode defined via the manifest, and in the event of detecting that the program has terminated, restart execution of the program. In this example or any other example, the runtime service is further configured to save one or more parameters indicating a state of the program before the program terminated; and wherein restarting execution of the program is parametrized by the one or more saved parameters. In this example or any other example, the program is one of a plurality of user-controllable programs, and another program of the plurality of user-controllable programs is registered via the registration service and executed persistently via the runtime service. In this example or any other example, the registration service is further configured to register a manifest prohibiting execution of a second, different program, and the runtime service is further configured, in the event of detecting a request to start execution of the second program, to reject such request and prevent execution of the second program. In this example or any other example, the termination request is a termination command input via a graphical user interface of the program. In this example or any other example, the termination request is an external termination signal received from a different program. In this example or any other example, the persistence mode defined via the manifest indicates the program is a startup program, and wherein the runtime service is configured to automatically start the program responsive to booting an operating system utilizing the runtime service. In this example or any other example, the persistence mode defined via the manifest indicates the program is a prerequisite program satisfying a dependency of a different, dependent program, and the runtime service is configured to automatically start execution of the prerequisite program responsive to a request to start execution of the dependent program. In this example or any other example, registering the manifest is performed automatically while installing the program. In this example or any other example, the program may be installed by a user without supplying an administrator credential. In this example or any other example, registering the manifest is performed responsive to an administrator command received by the registration service. In this example or any other example, the persistence mode defined by the manifest indicates the program has a persistent graphical user interface, and the runtime service is configured, based on the persistence mode defined via the manifest, and in the event of detecting a request to hide a graphical user interface of the program, to reject such request and prevent hiding the graphical user interface. In this example or any other example, the program is configured to: communicatively couple with a controller program; receive, from the controller program, a request to execute the program according to a new configuration; and continue executing the program according to the new configuration. In this example or any other example, the program is a background service which is executable without a graphical user interface. In this example or any other example, detecting the program has terminated includes detecting that the program is in an error state, and wherein restarting execution of the program includes starting execution of the program in a re-initialized state different than the error state. In this example or any other example, rejecting the termination request and preventing termination of the program includes presenting a notification explaining that termination of the program was prevented by the runtime service.

In an example, a method for persistently executing programs, comprises: registering a manifest defining a persistence mode of a user-controllable program; based on the persistence mode defined via the manifest, and in the event of detecting a termination request for the program during execution of the program, rejecting such request and preventing termination of the program; and based on the persistence mode defined via the manifest, and in the event of detecting that the program has terminated, restarting execution of the program.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device configured to persistently execute programs, comprising:
a logic machine; and
a storage machine holding instructions executable by the logic machine to:
operate a registration service configured to register, for each program of a plurality of user-installed, user-controllable programs, a program-specific manifest defining a persistence mode for that program, wherein the persistence mode defined via the manifest indicates the program is a startup program, the persistence mode indicating that the program has a persistent graphical user interface; and
operate a runtime service configured, for each program of the plurality of user-installed, user-controllable programs, to:
based on the persistence mode defined via the manifest, and responsive to detecting a termination request for the program during execution of the program, reject such request and prevent termination of the program;
based on the persistence mode defined via the manifest, and responsive to detecting a request to hide the persistent graphical user interface of the program, reject such request and prevent hiding the persistent graphical user interface; and
based on the persistence mode defined via the manifest, and responsive to detecting that the program has terminated:
save one or more parameters indicating a state of the program before the program terminated; and
restart execution of the program, w herein such execution is parametrized by the one or more saved parameters.

2. The computing device of claim 1, w herein detecting the program has terminated includes detecting that the program is in an error state, and wherein restarting execution of the program includes starting execution of the program in a re-initialized state different than the error state.

3. The computing device of claim 1, w herein the program is configured to:
communicatively couple with a controller program;
receive, from the controller program, a request to execute the program according to a new configuration; and
continue executing the program according to the new configuration.

4. A computing device configured to persistently execute programs, comprising:
a logic machine; and
a storage machine holding instructions executable by the logic machine to:
operate a registration service configured to register a program-specific manifest defining a persistence mode of a user-installed, user-controllable program, wherein the persistence mode defined via the manifest indicates the program is a startup program, the persistence mode indicating that the program has a persistent graphical user interface; and
operate a runtime service configured to:
based on the persistence mode defined via the manifest, and responsive to detecting a termination request for the program during execution of the program, reject such request and prevent termination of the program;
based on the persistence mode defined via the manifest, and responsive to detecting a request to hide the persistent graphical user interface of the program, reject such request and prevent hiding the persistent graphical user interface; and
based on the persistence mode defined via the manifest, and responsive to detecting that the program has terminated, restart execution of the program.

5. The computing device of claim 4, wherein the runtime service is further configured to save one or more parameters indicating a state of the program before the program terminated; and wherein restarting execution of the program is parametrized by the one or more saved parameters.

6. The computing device of claim 4, wherein the program is one of a plurality of user-controllable programs, and w herein another program of the plurality of user-controllable programs is registered via the registration service and executed persistently via the runtime service.

7. The computing device of claim 4, wherein the registration service is further configured to register a manifest prohibiting execution of a second, different program, and w herein the runtime service is further configured, responsive to detecting a request to start execution of the second program, to reject such request and prevent execution of the second program.

8. The computing device of claim 4, wherein the termination request is a termination command input via a graphical user interface of the program.

9. The computing device of claim 4, wherein the termination request is an external termination signal received from a different program.

10. The computing device of claim 4, wherein the persistence mode defined via the manifest indicates the program is a prerequisite program satisfying a dependency of a different, dependent program and wherein the runtime service is configured to automatically start execution of the prerequisite program responsive to a request to start execution of the dependent program.

11. The computing device of claim 4, w herein registering the manifest is performed automatically while installing the program.

12. The computing device of claim 4, w herein the program may be installed by a user without supplying an administrator credential.

13. The computing device of claim 4, w herein registering the manifest is performed responsive to an administrator command received by the registration service.

14. The computing device of claim 4, w herein the program is configured to:
communicatively couple with a controller program;
receive, from the controller program, a request to execute the program according to a new configuration; and
continue executing the program according to the new configuration.

15. The computing device of claim 4, wherein detecting the program has terminated includes detecting that the program is in an error state, and w herein restarting execution of the program includes starting execution of the program in a re-initialized state different than the error state.

16. The computing device of claim 4, w herein rejecting the termination request and preventing termination of the program includes presenting a notification explaining that termination of the program was prevented by the runtime service.

17. A method for persistently executing programs, comprising:
registering a program-specific manifest defining a persistence mode of a user-installed, user-controllable program, wherein the persistence m ode defined via the manifest indicates the program is a startup program, the persistence mode indicating that the program has a persistent graphical user interface;
based on the persistence mode defined via the manifest, and responsive to detecting a request to hide the persistent graphical user interface of the program, reject such request and prevent hiding the persistent graphical user interface;
based on the persistence mode defined via the manifest, and responsive to detecting a termination request for the program during execution of the program, rejecting such request and preventing termination of the program; and
based on the persistence mode defined via the manifest, and responsive to detecting that the program has terminated, restarting execution of the program.

* * * * *